(12) United States Patent
Kim (10) Patent No.: US 7,992,344 B2
(45) Date of Patent: Aug. 9, 2011

(54) ARTIFICIAL SOIL AND METHOD FOR GROWING VEGETATION ON SLOPED SURFACE USING THE SAME

(75) Inventor: Young-Koo Kim, Seoul (KR)

(73) Assignee: Transcorea Development Co. Ltd., Seoul (KR)

( * ) Notice: Subject to any disclaimer, the term of this patent is extended or adjusted under 35 U.S.C. 154(b) by 0 days.

(21) Appl. No.: 12/841,886

(22) Filed: Jul. 22, 2010

(65) Prior Publication Data

US 2010/0281774 A1    Nov. 11, 2010

(51) Int. Cl.
*A01B 79/02*    (2006.01)
(52) U.S. Cl. ............... 47/1.01 T; 47/1.01 F; 47/58.1 SC
(58) Field of Classification Search .............. 71/24, 903; 47/9, 1.01 F, 1.01 T, 1.01 R, 58.1 R, 58.1 SC, 47/59 S
See application file for complete search history.

(56) References Cited

U.S. PATENT DOCUMENTS

5,607,494 A    3/1997    Kim ................................... 71/6

*Primary Examiner* — T. Nguyen
(74) *Attorney, Agent, or Firm* — Jacobson Holman PLLC

(57) ABSTRACT

An artificial soil and a method for growing vegetation on a sloped surface using the same are disclosed. The artificial soil is produced by mixing peat or grass peat, paper chip or pulp chip, saw dust or bark, fermented animal waste or dried animal waste, and a microbe activator, frisol; and by adding clay or Silt(SILT) or granular to the mixture. The method comprises forming a vegetation base layer by applying the artificial soil to a sloped surface; waiting until the vegetation base layer has a crack by a shrinkage; and applying a seed mixture of artificial soil over the vegetation base layer, the seed mixture of artificial soil obtained by adding a myocardium catalyst, a microbe activator, a material binder, an evaporation prevention material, and grass seeds, weed seeds, and tree seeds to the artificial soil with water.

1 Claim, 5 Drawing Sheets

ARTIFICIAL SOIL AND METHOD FOR GROWING VEGETATION ON SLOPED SURFACE USING THE SAME

RELATED APPLICATION

The present disclosure relates to subject matter contained in priority Korean Application No. 10-2007-0078551, filed on Aug. 6, 2007, which is herein expressly incorporated by reference in its entirety.

BACKGROUND OF THE INVENTION

1. Field of the Invention

The present invention relates to an artificial soil and a method for growing vegetation on a sloped surface using the same.

2. Description of the Background Art

On the surface of a slope of cut earth or rock where the environment for growing vegetation is poor, applying soil of a suitable thickness onto the slope will improve the ability of vegetation to be grown thereon.

Installation of a wire mesh with a soil layer over the cut rock surface has also been tried. However, the moisture retaining capacity of the soil is very limited and therefore the soil layer generally must be greater than 12 cm to retain moisture therein. Accordingly, a large amount of soil is required. Heavy equipment for high pressure spraying is also required. After application of the layer of soil, the soil has a tendency to erode as a result of insufficient adhesion between the surface of the cut rock and the soil.

As a demand for natural environment is increased nowadays, a desirable artificial soil and a method for growing vegetation are required.

In the conventional method for growing vegetation, a PVC coated wire is fixed to a sloped surface of cut earth, and grass seeds are mixed with a vegetation base material. Here, the vegetation base material is mainly composed of sewage sludge. Due to inconvenience of the resident in an area under the construction, a new vegetation base material is required to be developed.

U.S. Pat. No. 5,607,494 to Young-Koo KIM discloses an artificial soil composition and a method of growing vegetation on a sloped surface using the same.

SUMMARY OF THE INVENTION

Therefore, an object of the present disclosure is to provide an artificial soil capable of growing vegetation with a fertile state even during a drought by retaining sufficient moisture and nutrition which are necessary conditions to grow vegetation, and a method for growing vegetation on a sloped surface using the same.

Another object of the present disclosure is to provide an artificial soil capable of allowing the resident in an area under the construction not to have discomfort, and a method for growing vegetation on a sloped surface using the same.

Still another object of the present disclosure is to provide an artificial soil capable of being applied with using a moderately sized soil spraying equipment by minimizing an installation thickness and satisfying all conditions for growing vegetation, and a method for growing vegetation on a sloped surface using the same.

To achieve these and other advantages and in accordance with the purpose of the present disclosure, as embodied and broadly described herein, there is provided an artificial soil produced by mixing peat or grass peat in a concentration of 15~40% by volume, paper chip or pulp chip in a concentration of 20~43% by volume, saw dust or bark or wood chip in a concentration of 5~30% by volume, fermented animal waste or dried animal waste in a concentration of 7~30% by volume, and a microbe activator, frisol F in a concentration of 2~10% by volume; and by adding clay or Silt (SILT) or granular soil in a concentration of 20~45% by volume to the mixture.

To achieve these and other advantages and in accordance with the purpose of the present disclosure, as embodied and broadly described herein, there is also provided a method for growing vegetation on a sloped surface using an artificial soil, comprising: forming a vegetation base layer by applying the artificial soil to a sloped surface; waiting until the vegetation base layer has a crack by a shrinkage; and applying a seed mixture of artificial soil over the vegetation base layer, the seed mixture of artificial soil obtained by adding a myocardium catalyst, a microbe activator, a material binder, an evaporation prevention material, grass seeds, weed seeds and tree seeds to the artificial soil with water.

According to another aspect of the present invention, there is provided a method for growing vegetation on a sloped surface using an artificial soil, comprising: installing a meshing formed from PVC coated wire on a surface of a cut sloped surface with a certain gap; applying the artificial soil between the surface of the sloped surface and the meshing, and onto the meshing, thereby forming a base layer of artificial soil; waiting until the base layer of artificial soil has a crack by a shrinkage; and forming a seed mixture layer of artificial soil on a surface of the base layer of artificial soil by applying a seed mixture of artificial soil onto the surface of the base layer of artificial soil, the seed mixture of artificial soil obtained by adding a myocardium catalyst, a microbe activator, a material binder, and indigenous grass seeds, weed seeds and tree seeds to the artificial soil with water.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the invention and are incorporated in and constitute a part of this is specification, illustrate embodiments of the invention and together with the description serve to explain the principles of the invention.

In the drawings.

DETAILED DESCRIPTION OF THE INVENTION

Reference will now be made in detail to the preferred embodiments of the present disclosure, examples of which are illustrated in the accompanying drawings.

An artificial soil and a method for growing vegetation on a sloped surface using the same according to the present invention will be explained in more detail.

The artificial soil according to the present invention is produced by mixing peat or grass peat in a concentration of 15~40% by volume, paper chip or pulp chip in a concentration of 20~43% by volume, saw dust or bark or wood chip in a concentration of 5~30% by volume, fermented animal waste or dried animal waste in a concentration of 7~30% by volume, and a microbe activator, frisol F in a concentration of 2~10% by volume; and by adding clay or Silt (SILT) or granular soil in a concentration of 20~45% by volume to the mixture.

The peat is estimated to have been accumulated to undergo humification by an anaerobic analysis in a process that grouped plants in a wet area are accustomed to live in a dry land while growing and withering repeatedly. Accordingly, peat eroded as organic matters are decomposed exists in a hot and dry area, whereas peat in a slow decomposition process or in no process exists in a cold area with moist winter.

The peat has a high nutrient retaining capability and moisture retaining capability, and is not secondarily fermented, thereby not causing a damage to plants but being beneficial to the plants.

<Table Showing an Analysis for Components of Peat and Sewage Sludge>

| Material | pH | OM (%) | $P_2O_5$ (ppm) | Ca (%) | Mg (%) | K (%) | Na (%) | T-N (%) | Moisture retaining capability (%/time) |
|---|---|---|---|---|---|---|---|---|---|
| Sewage sludge cake | 6.3 | 25 | 464 | 12.8 | 4.2 | 1.2 | 1.4 | 2.01 | 65/97 |
| Peat | 6.8 | 42 | 184 | 10.8 | 2.7 | 0.3 | 0.2 | 1.83 | 80/97 |

A pH of a soil suitable for a plant growth is in a range of 6~7.5, and a pH of a high level is 6~6.5. A pH of the peat is 6.8, which is suitable for a plant growth.

The peat has an organic matter (OM) in a concentration of 42% by volume higher than that of the sewage sludge cake in a concentration of 25% by volume, which is beneficial to a plant growth. Generally, a soil having $P_2O_5$ of 200 ppm or more is classified into a high level, and a soil having able $P_2O_5$ of 200 ppm~100 ppm is classified into a middle level. The peat has $P_2O_5$ of 184 ppm, which is suitable for a plant growth. Also, the peat has a good moisture retaining capability of $65/97$ (%/time).

<Table Showing an Analysis for Components of Paper Chip and Pulp Chip>

| Moisture retaining capability (%/time) | OM (%) | T-N (%) | $P_2O_5$ (ppm) | pH |
|---|---|---|---|---|
| 85/97 | 56 | 2.63 | 180 | 6.5 |

Once paper chip is made to be powder by being soaked to water, the paper chip has the same moisture retaining capability as pulp chip. The paper chip and the pulp chip have a high moisture retaining capability, and contains a good available phosphate.

Grass peat is generated in a similar way to the peat, and is sometimes classified into the same material as the peat. However, the grass peat is different from the peat as follows. The grass peat is clayey peat generated as plants including peat trees are accumulated, which is similar to black clay. On the contrary, the peat is generated as herb, moss, etc. are accumulated, which is a fine fiber and has a small mass of about 0.5% by volume. The grass peat can be used as an organic fertilizer on a grass field, or can be used for plants including crops.

<Table Showing an Analysis for Components of Peat>

| $K_2O$ (%) | T-N (%) | OM (%) | $P_2O_5$ (ppm) | pH |
|---|---|---|---|---|
| 0.19 | 1.78 | 85 | 726 | 5.5 |

The grass peat has a moisture cell that occupies 89% by volume, and has a good air permeability, moisture retaining capability, and nutrient retaining is capability.

As a microbe activator which is a nutrient for growing a plant, frisol F is used.

Once the frisol F is mixed with soil, the frisol F remains at the soil for a long time without being lost. Accordingly, the frisol F has an effect that forest soil is covered with fallen leaves. The frisol F is a granular material produced by mixing a microbe that is perished by processing a microbe mass at a temperature of 130° C. with nutrient. Accordingly, the frisol F circulates in correspondence with nutrient inside the soil, and supplies the nutrient that can be easily used at a root to a plant by accelerating a complicated microbial operation. The frisol F enables the soil to be serve as good soil and to have a strong endurance against germ or difficulties.

<Table Showing an Analysis for Components of Saw Dust and Bark or Wood Chip>

| Material | pH | OM (%) | T-N (%) | CaO (%) | $K_2O$ (%) | MgO (%) | $P_2O_5$ (ppm) | T-C (%) | C/N (%) |
|---|---|---|---|---|---|---|---|---|---|
| Saw dust | 4.8 | 85.6 | 0.18 | 0.89 | 0.23 | 0.12 | 85 | 49.7 | 276 |
| Bark or wood chip | 5.97 | 98 | 0.26 | 1.00 | 0.08 | 0.08 | 90 | 56.8 | 218 |

Even if both the saw dust and the bark or wood chip have a weak acidity, there is no problem in an entire pH of the artificial soil since other materials have a pH close to a weak alkalinity. Since the saw dust and the bark or wood chip have good available phosphate and have a great amount of organic matter, they activate aerobic microorganism to be fermented when being mixed with animal waste, etc., and perform a moisture retaining capability and a nutrient controlling function when being mixed with the artificial soil.

<Table Showing an Analysis for Components of Animal Waste>

| Material | T-N (%) | P₂O₅ (ppm) | K₂O (%) | Ca (%) | Mg (%) | C/N | OM (%) |
|---|---|---|---|---|---|---|---|
| Cow waste | 0.84 | 350 | 0.35 | 0.34 | 0.17 | 16 | 82 |
| Saw dust + cow waste | 0.59 | 276 | 0.68 | 1.02 | 0.24 | 29 | 84 |

Once a saw dust is mixed with an animal waste and then is decayed, the mixture has an enhanced nitrogen and phosphoric acid. The mixture has a high nutrition, a sufficient organic matter, a good microbe-activating function, and a high latent effect, thereby enhancing a quality of the artificial soil when being mixed with the artificial soil.

<Physical Characteristics of Clay, Granular Soil and Silt (Silt)>

| Material | Diameter (mm) | Moisture retaining amount | Capillary pressure | Moisture and nutrition retaining capability | Adhering force | Air permeability |
|---|---|---|---|---|---|---|
| Clay | 0.002 or less | Very large | Very high | Very high | Very strong | Very poor |
| Granular soil | 0.10~0.05 | Small | High | High | Weak | Good |
| Silt (SILT) | 0.02~0.002 | Large | High | High | Strong | Poor |

An artificial soil is mixed with clay or granular soil or Silt (SILT) in order to control a solid phase, a liquid phase and a gas liquid thereof. A small particle has a good moisture retaining capability but has a poor air permeability. On the contrary, a large particle has a low moisture retaining capability but has a good air permeability. A proper amount of the small and large particles are mixed with the materials of the artificial soil to compensate for each characteristic, thereby producing a good artificial soil.

<Table Showing an Analysis for Components of Frisol F>

| OM (%) | N (%) | K₂O (%) | P₂O₅ (%) | MgO (%) | Fe (ppm) | Zn (ppm) | Cu (ppm) | Mn (ppm) | Na (%) | Cl (%) |
|---|---|---|---|---|---|---|---|---|---|---|
| 80 | 8 | 2 | 2 | 1 | 630 | 28 | 15 | 42 | Less than 1 | Less than 1 |

Example 1

Peat in a concentration of 15% by volume, paper chip in a concentration of 43% by volume, saw dust in a concentration of 30% by volume, fermented animal waste in a concentration of 7% by volume, and a microbe activator, frisol F in a concentration of 5% by volume were mixed with one another. Then, the mixture were deposited and decayed for more than 10 days, thereby obtaining a decayed material.

Clay in a concentration of 20% by volume was mixed with the decayed material, thereby producing an artificial soil.

The produced artificial soil has the following components.

<Table Showing an Analysis for Components of Artificial Soil>

| PH | OM (%) | P₂O₅ (%) | Ca (%) | Mg (%) | K (%) | Na (%) | T-N (%) |
|---|---|---|---|---|---|---|---|
| 6.5 | 23.5 | 520 | 17.5 | 3.97 | 0.54 | 0.19 | 2.92 |

Example 2

Peat in a concentration of 25% by volume, paper chip in a concentration of 35% by volume, saw dust in a concentration of 21% by volume, fermented animal waste in a concentration of 16% by volume, and a microbe activator, frisol F in a concentration of 3% by volume were mixed with one another. Then, the mixture were deposited and decayed for more than 10 days, thereby obtaining a decayed material.

Silt (SILT) in a concentration of 24% by volume was mixed with the decayed material, thereby producing an artificial soil.

The produced artificial soil has the following components.

<Table Showing an Analysis for Components of Artificial Soil>

| PH | OM (%) | P₂O₅ (%) | Ca (%) | Mg (%) | K (%) | Na (%) | T-N (%) |
|---|---|---|---|---|---|---|---|
| 6.7 | 23.1 | 492 | 17.2 | 3.96 | 0.53 | 0.17 | 2.89 |

Example 3

Peat in a concentration of 28% by volume, pulp chip in a concentration of 23% by volume, bark or wood chip in a concentration of 17% by volume, dried animal waste in a concentration of 25% by volume, and a microbe activator, frisol F in a concentration of 7% by volume were mixed with one another. Then, the mixture were deposited and decayed for more than 10 days, thereby obtaining a decayed material.

Granular soil in a concentration of 31% by volume was mixed with the decayed material, thereby producing an artificial soil.

The produced artificial soil has the following components.

<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.6 | 22.5 | 485 | 17.1 | 3.93 | 0.51 | 0.16 | 2.88 |

Example 4

Peat in a concentration of 21% by volume, pulp chip in a concentration of 30% by volume, bark or wood chip in a concentration of 23% by volume, dried animal waste in a concentration of 18% by volume, and a microbe activator, frisol F in a concentration of 8% by volume were mixed with one another. Then, the mixture were deposited and decayed for more than 10 days, thereby obtaining a decayed material.

Clay in a concentration of 36% by volume was mixed with the decayed material, thereby producing an artificial soil.

The produced artificial soil has the following components.
<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.6 | 21.9 | 476 | 16.9 | 3.92 | 0.49 | 0.16 | 2.86 |

Example 5

Peat in a concentration of 36% by volume, paper chip in a concentration of 22% by volume, saw dust in a concentration of 13% by volume, fermented animal waste in a concentration of 20% by volume, and a microbe activator, frisol F in a concentration of 9% by volume were mixed with one another. Then, the mixture were deposited and decayed more than 10 days, thereby obtaining a decayed material.

Silt (SILT) in a concentration of 40% by volume was mixed with the decayed material, thereby producing an artificial soil.

The produced artificial soil has the following components.
<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.5 | 21.2 | 468 | 16.7 | 3.85 | 0.48 | 0.15 | 2.85 |

Example 6

Peat in a concentration of 40% by volume, pulp chip in a concentration of 25% by volume, bark or wood chip in a concentration of 5% by volume, dried animal waste in a concentration of 20% by volume, and a microbe activator, frisol F in a concentration of 10% by volume were mixed with one another. Then, the mixture were deposited and decayed for more than 10 days, thereby obtaining a decayed material.

Granular soil in a concentration of 45% by volume was mixed with the decayed material, thereby producing an artificial soil.

The produced artificial soil has the following components.
<Table Showing an Analysis for Components of Artificial Soil>

| pH | OM (%) | $P_2O_5$ (%) | Ca (%) | Mg (%) | K (%) | Na (%) | T-N (%) |
|---|---|---|---|---|---|---|---|
| 6.5 | 20.8 | 452 | 16.5 | 3.79 | 0.47 | 0.15 | 2.83 |

Example 7

Peat in a concentration of 16% by volume, paper chip in a concentration of 43% by volume, saw dust in a concentration of 29% by volume, fermented animal waste in a concentration of 7% by volume, and a microbe activator, frisol F in a concentration of 5% by volume were mixed with one another. Then, the mixture were deposited and decayed for more than 10 days, thereby obtaining a decayed material.

Clay in a concentration of 20% by volume was mixed with the decayed material, thereby producing an artificial soil.

The produced artificial soil has the following components.
<Table Showing an Analysis for Components of Artificial Soil>

| pH | OM (%) | $P_2O_5$ (%) | Ca (%) | Mg (%) | K (%) | Na (%) | T-N (%) |
|---|---|---|---|---|---|---|---|
| 6.5 | 24.3 | 543 | 17.2 | 3.95 | 0.56 | 0.21 | 3.12 |

Example 8

Peat in a concentration of 26% by volume, paper chip in a concentration of 35% by volume, saw dust in a concentration of 23% by volume, fermented animal waste in a concentration of 16% by volume, and a microbe activator, frisol F in a concentration of 3% by volume were mixed with one another. Then, the mixture were deposited and decayed for more than 10 days, thereby obtaining a decayed material.

Silt (SILT) in a concentration of 25% by volume was mixed with the decayed material, thereby producing an artificial soil.

The produced artificial soil has the following components.
<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.7 | 23.5 | 511 | 16.8 | 3.87 | 0.57 | 0.19 | 3.15 |

Example 9

Peat in a concentration of 31% by volume, pulp chip in a concentration of 22% by volume, bark or wood chip in a concentration of 16% by volume, dried animal waste in a concentration of 24% by volume, and a microbe activator, frisol F in a concentration of 7% by volume were mixed with one another. Then, the mixture were deposited and decayed for more than 10 days, thereby obtaining a decayed material.

Granular soil in a concentration of 30% by volume was mixed with the decayed material, thereby producing an artificial soil.

The produced artificial soil has the following components.
<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.7 | 23.5 | 498 | 17.3 | 3.71 | 0.49 | 0.17 | 3.09 |

Example 10

Peat in a concentration of 26% by volume, pulp chip in a concentration of 27% by volume, bark or wood chip in a concentration of 21% by volume, dried animal waste in a concentration of 18% by volume, and a microbe activator, frisol F in a concentration of 8% by volume were mixed with one another. Then, the mixture were deposited and decayed for more than 10 days, thereby obtaining a decayed material.

Clay in a concentration of 35% by volume was mixed with the decayed material, thereby producing an artificial soil.

The produced artificial soil has the following components.
<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.8 | 22.7 | 487 | 16.3 | 3.78 | 0.41 | 0.19 | 3.02 |

Example 11

Peat in a concentration of 38% by volume, paper chip in a concentration of 22% by volume, saw dust in a concentration of 13% by volume, fermented animal waste in a concentration of 18% by volume, and a microbe activator, frisol F in a concentration of 9% by volume were mixed with one another. Then, the mixture were deposited and decayed for more than 10 days, thereby obtaining a decayed material.

Silt (SILT) in a concentration of 40% by volume was mixed with the decayed material, thereby producing an artificial soil.

The produced artificial soil has the following components.
<Table Showing an Analysis for Components of Artificial Soil>

| PH | OM (%) | $P_2O_5$ (%) | Ca (%) | Mg (%) | K (%) | Na (%) | T-N (%) |
|---|---|---|---|---|---|---|---|
| 6.7 | 22.2 | 471 | 16.2 | 3.81 | 0.43 | 0.17 | 2.96 |

Example 12

Peat in a concentration of 40% by volume, pulp chip in a concentration of 25% by volume, bark or wood chip in a concentration of 5% by volume, dried animal waste in a concentration of 20% by volume, and a microbe activator, frisol F in a concentration of 10% by volume were mixed with one another. Then, the mixture were deposited and decayed for more than 10 days, thereby obtaining a decayed material.

Granular soil in a concentration of 45% by volume was mixed with the decayed material, thereby producing an artificial soil.

The produced artificial soil has the following components.
<Table Showing an Analysis for Components of Artificial Soil>

| pH | OM (%) | $P_2O_5$ (%) | Ca (%) | Mg (%) | K (%) | Na (%) | T-N (%) |
|---|---|---|---|---|---|---|---|
| 6.5 | 21.9 | 468 | 16.1 | 3.77 | 0.44 | 0.15 | 2.83 |

Hereinafter, a method for growing vegetation on a sloped surface using an artificial soil according to the present invention will be explained.

Figure 1:
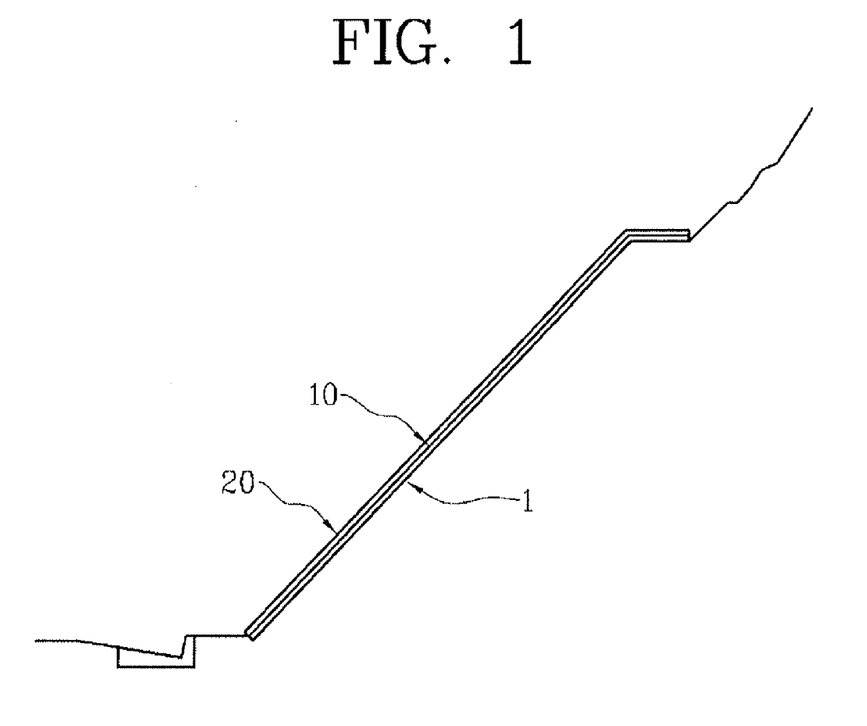
FIG. 1 is a sectional view showing a method for growing vegetation on a sloped surface according to a first embodiment of the present invention, which shows a state of a process for growing vegetation has been completed.
Figure 2A:
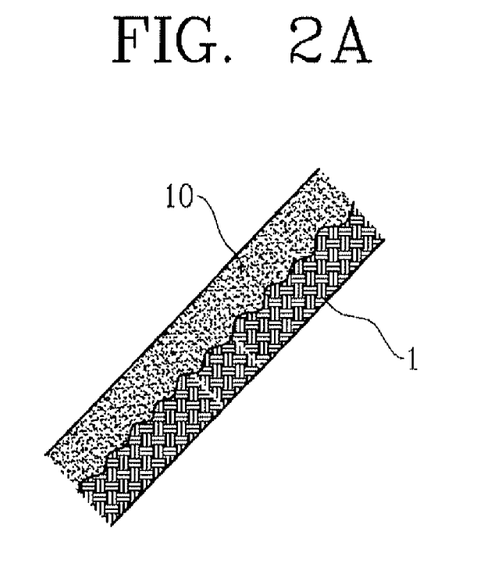
FIGS. 2A to 2C are partial enlarged views showing the process is being performed, respectively.
Figure 2B:
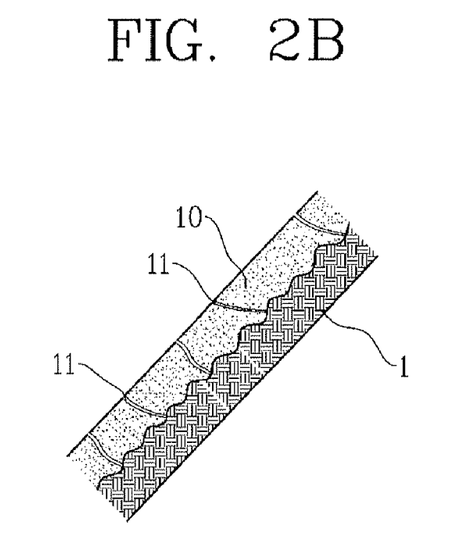
Figure 2C:
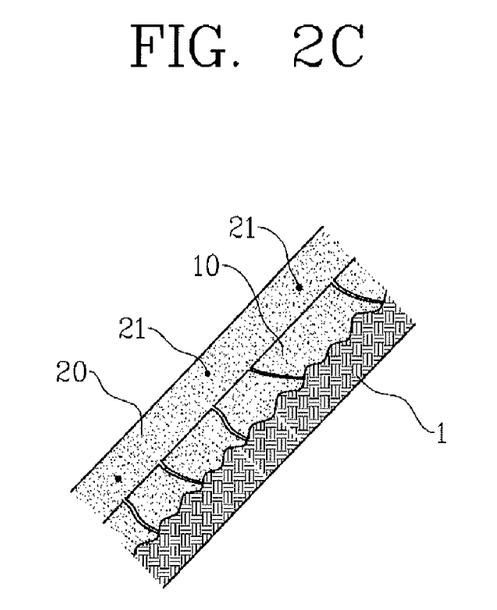

FIGS. 1 and 2 show a method for growing vegetation on a sloped surface according to a first embodiment of the present invention, respectively.

The method for growing vegetation on a sloped surface using an artificial soil according to a first embodiment of the present invention, comprises: forming a vegetation base layer 10 on a sloped surface 1 by applying the artificial soil thereto as shown in FIG. 2A; waiting until the vegetation base layer 10 has a crack 11 by a shrinkage as shown in FIG. 2B; and applying a seed mixture 20 of artificial soil over the vegetation base layer 10 as shown in FIG. 2C, the seed mixture 20 of artificial soil obtained by adding a myocardium catalyst, a microbe activator, a material binder, an evaporation prevention material, and a grass seeds, weed seeds and tree seeds to the artificial soil with water.

The reference numeral '21' denotes grass seeds, weed seeds, and tree seeds.

When three months lapsed after the method for growing vegetation on a sloped surface using an artificial soil according to the first embodiment of the present invention has been applied, the grass seeds and the tree seeds sprouted to grow well. The tree seeds grew with a good harmony with peripheral scenery.

Figure 3:
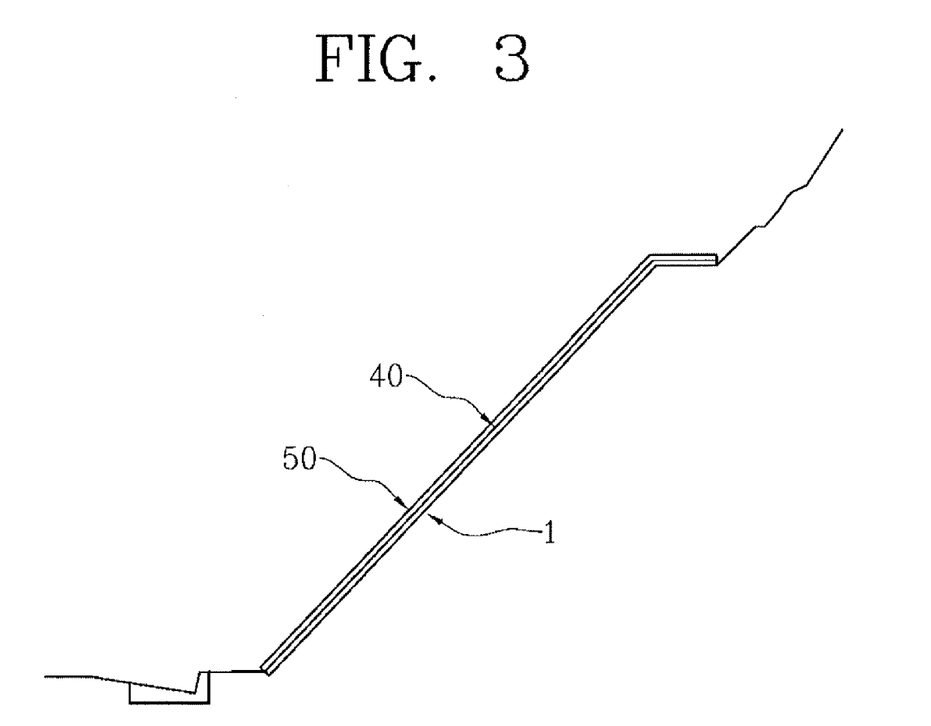
FIG. 3 is a sectional view showing a method for growing vegetation on a sloped surface according to a second embodiment of the present invention, which shows a state of a process for growing vegetation has been completed.
Figure 4A:
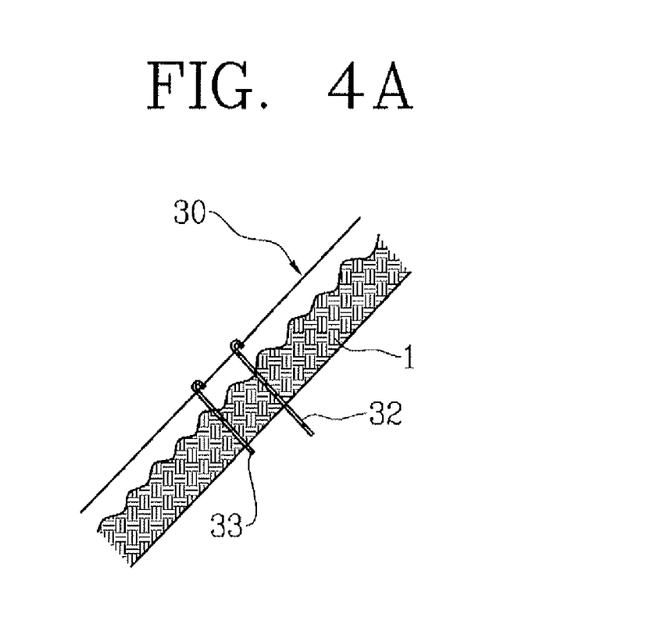
FIGS. 4A to 4D are partial enlarged views showing the process is being performed, respectively.
Figure 4B:
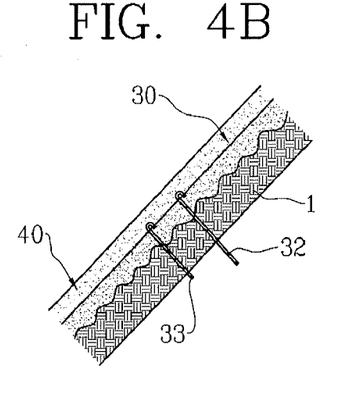
Figure 4C:
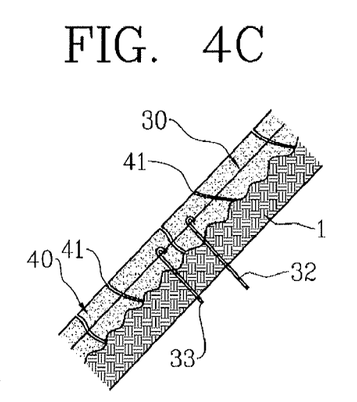
Figure 4D:
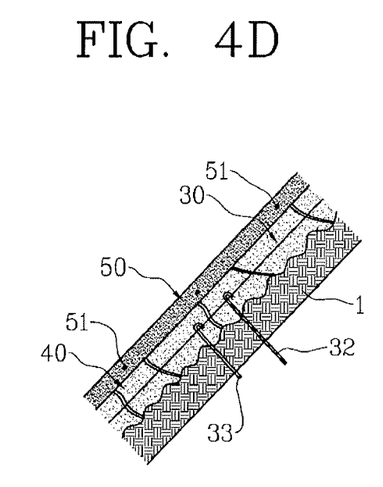
Figure 5:
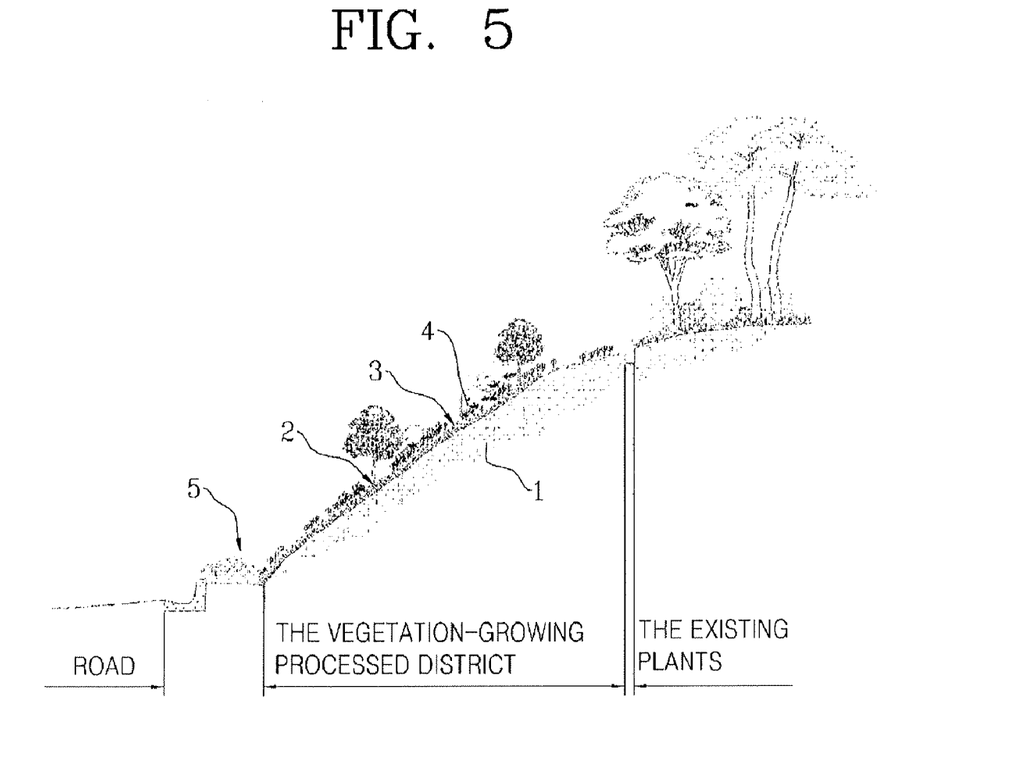
FIG. 5 is an unfolded view of a meshing.

FIGS. 3 to 5 show a method for growing vegetation on a sloped surface according to a second embodiment of the present invention, respectively.

The method for growing vegetation on a sloped surface using an artificial soil according to a second embodiment of the present invention, comprises: installing a meshing 30 formed from PVC coated wire on a surface of a cut sloped surface 1 with a certain gap as shown in FIG. 4A; applying the artificial soil between the surface of the sloped surface 1 and the meshing 30, and onto the meshing 30, thereby forming a base layer of artificial soil 40 as shown in FIG. 4B; waiting until the base layer of artificial soil 40 has a crack 41 by a shrinkage as shown in FIG. 4C; and forming a seed mixture layer 50 of artificial soil on a surface of the base layer of artificial soil 40 by applying a seed mixture of artificial soil onto the surface of the base layer of artificial soil as shown in FIG. 4D, the seed mixture of artificial soil obtained by adding a myocardium catalyst, a microbe activator, a material binder, and indigenous grass seeds, weed seeds, tree seeds to the artificial soil with water.

The meshing 30 is formed from PVC coated wire. The PVC coated wire 31 is installed with a gap of 2 m in horizontal and vertical directions, and then are fixed to the surface of the sloped surface 1 by an anchor pin 32 and a securing pin 33.

As the PVC coated wire, a net having a size of 65 mm×65 mm is preferably used. Preferably, the anchor pin 32 has a diameter of 16 mm and a length of 500 mm. Preferably, the securing pin 33 has a diameter of 16 mm and a length of 350 mm.

The seed mixture of artificial soil constituting the seed mixture layer 50 of artificial soil is obtained by mixing 10λ of the artificial soil in 1 m² of the base layer of artificial soil 40 with 130 g of frisol A, 300 g of frisol F, 20 g of frisol S, grass seeds, weed seeds, and tree seeds with water.

Preferably, the base layer of artificial soil 40 has a thickness of 80~100 mm, and the seed mixture layer 50 of artificial soil has an average thickness of 10 mm.

When three months lapsed after the method for growing vegetation on a sloped surface using an artificial soil according to the second embodiment of the present invention has been applied, the grass seeds and the tree seeds sprouted to grow well. The tree seeds grew with a good harmony with peripheral scenery.

Figure 6:
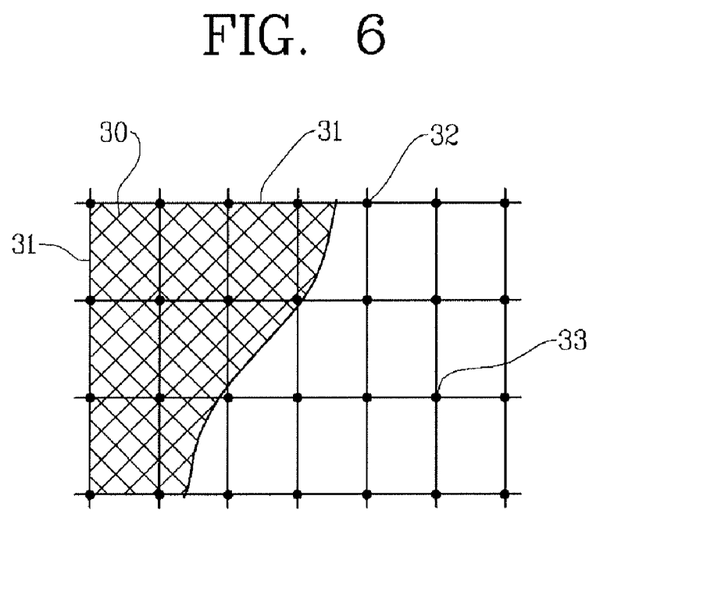
FIG. 6 is a conceptual view of an area that has undergone a process for growing vegetation on a sloped surface using an artificial soil according to the present invention.

FIG. 6 is a conceptual view of an area that has undergone a process for growing vegetation on a sloped surface using an artificial soil according to the present invention.

Referring to FIG. 6, reference numeral 2 denotes an area to which the tree seeds are dispersed, 3 denotes a part of the seed mixture layer 50 of artificial soil, 4 denotes grass, weed, and tree, and 5 denotes an area where a plan for growing vegetation has been implemented.

The artificial soil and the method for growing vegetation on a sloped surface using the same according to the present invention has the following advantages.

When the artificial soil is applied to a sloped surface, seeds can fast sprout and vegetation can grow well.

Besides, vegetation can well grow against a drought due to a good moisture and nutrition retaining capability of the artificial soil.

Furthermore, the artificial soil applied to a sloped surface is in a good harmony with natural scenery.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. The method for growing vegetation on a sloped surface using an artificial soil produced by mixing peat or grass peat in a concentration of 15~40% by volume, paper chip or pulp chip in a concentration of 20~43% by volume, saw dust or bark or wood chip in a concentration of 5~30% by volume, fermented animal waste or dried animal waste in a concentration of 7~30% by volume, and a microbe activator, frisol F in a concentration of 2~10% by volume; and adding clay, silt or granular soil in a concentration of 20~45% by volume to the mixture, comprising:
   installing a mesh formed from PVC coated wire on a surface of a cut sloped surface with a certain gap;
   applying the artificial soil between the surface of the sloped surface and the mesh, and onto the mesh, thereby forming a base layer of artificial soil;
   waiting until the base layer of artificial soil has cracked by shrinkage; and
   forming a seed mixture layer of artificial soil on a surface of the base layer of artificial soil by applying a seed mixture of artificial soil onto the surface of the base layer of artificial soil, the seed mixture of artificial soil obtained by adding a myocardium catalyst, a microbe activator, a material binder, an evaporation prevention material, and indigenous grass seeds, weed seeds and tree seeds to the artificial soil with water.

* * * * *

UNITED STATES PATENT AND TRADEMARK OFFICE
CERTIFICATE OF CORRECTION

| | | |
|---|---|---|
| PATENT NO. | : 7,992,344 B2 | Page 1 of 1 |
| APPLICATION NO. | : 12/841886 | |
| DATED | : August 9, 2011 | |
| INVENTOR(S) | : Young-Koo Kim | |

It is certified that error appears in the above-identified patent and that said Letters Patent is hereby corrected as shown below:

On the Title Page,

After (65) Prior Publication Data, please insert the following paragraph:

-- Related U.S. Application Data (62) Division of application No. 11/905,445, filed on Oct. 1, 2007, now Pat. No. 7,788,846. --

Signed and Sealed this
Sixteenth Day of October, 2012

David J. Kappos
*Director of the United States Patent and Trademark Office*